United States Patent
Yang et al.

(10) Patent No.: US 9,317,809 B1
(45) Date of Patent: Apr. 19, 2016

(54) HIGHLY SCALABLE MEMORY-EFFICIENT PARALLEL LDA IN A SHARED-NOTHING MPP DATABASE

(71) Applicant: EMC Corporation, Hopkinton, MA (US)

(72) Inventors: Shengwen Yang, Beijing (CN); Caleb E. Welton, Foster City, CA (US); Guangxin Yang, Beijing (CN)

(73) Assignee: EMC Corporation, Hopkinton, MA (US)

( * ) Notice: Subject to any disclaimer, the term of this patent is extended or adjusted under 35 U.S.C. 154(b) by 192 days.

(21) Appl. No.: 14/037,293

(22) Filed: Sep. 25, 2013

(51) Int. Cl.
*G06F 9/44* (2006.01)
*G06N 7/02* (2006.01)
*G06N 7/06* (2006.01)
*G06N 5/04* (2006.01)
*G06N 7/04* (2006.01)
*G06N 7/00* (2006.01)
*G06N 99/00* (2010.01)

(52) U.S. Cl.
CPC *G06N 5/048* (2013.01); *G06N 5/04* (2013.01); *G06N 7/005* (2013.01); *G06N 7/04* (2013.01); *G06N 99/005* (2013.01)

(58) Field of Classification Search
None
See application file for complete search history.

(56) References Cited

U.S. PATENT DOCUMENTS

| | | | |
|---|---|---|---|
| 2012/0117008 A1* | 5/2012 | Xu et al. | 706/12 |
| 2014/0129510 A1* | 5/2014 | Vladislav et al. | 706/52 |
| 2014/0244701 A1* | 8/2014 | Welton et al. | 707/827 |

OTHER PUBLICATIONS

Greenplum Database: Critical Mass Innovation Architecture White Paper Aug. 2010.*
Probabilistic Topic Models: A focus on graphical model design and applications to document and image analysis Published in final edited form as: IEEE Signal Process Mag. Nov. 1, 2010; 27(6): 55-65. doi:10.1109/MSP.2010.938079.*
Data-Intensive Text Processing with MapReduce Jimmy Lin and Chris Dyer University of Maryland, College Park Manuscript prepared Apr. 11, 2010.*
A Comparison of Approaches to Large-Scale Data Analysis Andrew Pavlo Erik Paulson Alexander Rasin Daniel J. Abadi David J. DeWitt Samuel Madden Michael Stonebraker SIGMOD'09, Jun. 29-Jul. 2, 2009, Providence, Rhode Island, USA.*
A Split-Merge MCMC Algorithm for the Hierarchical Dirichlet Process Chong Wang David M. Blei.*
PLDA: Parallel Latent Dirichlet Allocation for Large-Scale Applications A. Goldberg and Y. Zhou (Eds.): AAIM 2009, LNCS 5564, pp. 301-314, 2009. Springer-Verlag Berlin Heidelberg 2009.*

* cited by examiner

*Primary Examiner* — Kakali Chaki
*Assistant Examiner* — Ababacar Seck
(74) *Attorney, Agent, or Firm* — Barry N. Young (57) ABSTRACT

Latent Dirichlet allocation (LDA) analysis on a dataset is performed on an MPP relational database by distributing subsets of said dataset to a plurality of segments of the MPP database, and performing LDA analysis in parallel on the respective subsets on the plurality of segments using Gibbs sampling. An object library on each segment provides executable objects of user defined functions that can be called by an SQL query when the query requires functionality provided by an object.

17 Claims, 7 Drawing Sheets

| docid | wordcount | words | counts |
|---|---|---|---|
| 1 | 1544 | {9144,9134,9118,9117,9063,9059,9037,9017,9010,8996,8959,8958,8943,8940,8937,8878,8880,8766,8740,8737,8709,8706,8665,8653,8635,8639,8637,8632,8628,8623,8620,8575,8572,8550,8531,8524,8520,8510,8508,8472,8466,8370,8211,8209,8187,8142,8140,8139,8062,8052,8051,8008,7995,7969,7949,7891,7874,7787,7766,3758,3772,3793,3804,3847,3867,3902,3925,3948,4007,4008,4013,4015,4101,4146,4177,4180,4182,4188,4268,4269,4270,4365,4372,4377,4378,4379,4385,4479,4490,4514,4553,4556,4598,4656,4670,4726,4777,4803,4805,4810,4832,4870,4893,4901,4953,5003,5031,5034,5037,5045,5164,5175,5177,5180,5182,5190,5220,5240,5244,5246,5263,5274,5283,5352,5370,5399,5422,5504,5553,5554,5589,5600,5604,5666,5686,5732,5784,5789,5803,5998,6008,... ...9303,9297,9296,9247,9219} | {1,1,1,2,1,2,1,1,3,2,1,3,2,1,2,1,3,1,2,2,1,2,2,1,2,1,1,4,15,8,1,1,2,1,1,1,1,1,5,1,1,2,2,2,8,4,10,1,30,1,4,1,3,1,3,5,1,1,1,1,2,1,1,5,1,5,1,7,7,1,1,4,6,1,1,1,2,7,2,1,1,36,2,1,7,2,1,2,3,1,2,1,2,7,16,1,1,3,1,1,1,38,1,1,1,2,2,1,1,4,5,1,1,1,4,1,3,1,1,7,2,17,5,1,1,1,1,2,1,1,1,1,2,1,2,1,1,1,2,3,1,6,1,2,5,1,3,1,18,1,2,3,3,3,5,1,1,1,1,2,1,1,2,3,1,1,1,21,1,2,4,1,1,1,1,3,1,2,4,67,1,2,1,2,1,2,1,1,20,8,1,1,3,1,1,1,1,1,3,2,1,1,1,17,1,4,3,1,1,2,17,2,1,1,1,1,1,1,2,1,1,1,3,1,2,1,1,1,1,2,1,3,1,1,3,2,1,2,2,1,1,3,1,3,1,1,1,1,2,1,1,1,3,2,2,1,1,2,1,1,4,16,1,4,3,1,3,1,1,1,1,4,1,1,1,1,4,4,1,1,1,1,3,2,1,1,2,1,1,3,1,1,1,1,4,2,2,1,1,1,1,2,2,1,1,1,1,1,1,1,2,1,1,4,1,1,3,4,1,2,7,2,1,1,1,2,3,1,4,1,1,1,1,1,1,1,2,1,3,1,4,3,2,1,3,3,3,1,2,1,1,1,3,4,3,1,6,2,1,1,1,1,1,2,1,4,3,1,3,1,1,1,1,2,1,1,1,1,1,1,1,2,2,1,2,1,2,1,4,3,1,2,2,1,1,5,3,1,2,1,1,1,1,1,2,1,1,2,1,2,1,1,2,1,24,1,2,3,1,1,2,1,1,20,4,1,7,2,1,1,2,1,1,1,1,7,1,1,1,6,1,8,1,3,5,1,8,1,7,3,3,1,4,2,2,1,1,1,1,1,37,3,2,2,4,3,2,1,6,1,1,4,5,4,1,2,2,47,2,1,1,1,1,1,3,1,1,1,2,1,1,1,1,1,2,1,16,1,1,2,1,1,2,1,1,1,1,8,3,1,1,6,13,12,15,2,2,2,1,1,2,1,4,1,2,2,1} |

FIGURE 5

| | | doc_topic | |
|---|---|---|---|
| | words | counts | topic_dist | topic_assign |

| doc_id | word_count | words | counts | topic_dist | topic_assign |
|---|---|---|---|---|---|
| 1 | 1544 | {9144,9134,9118,9117,9063, 9059,9037,9010,8996,8959,8 958,8943,8940,8937,8878,88 35,8766,8740,8737,8709,870 6,8665,8653,8652,8639,8637 ,8632,8628,8623,8620,8575, 8550,8531,8524,8520,8510,8 508,8472,8461,8370,8211,82 09,8187,8142,8140,8139,806 2,8052,8051,8008,7995,7969 ,7949,7891,7874,7787,7766, 3758,3772,3793,3804,3847,3 867,3902,3925,3948,4007,40 08,4013,4015,4101,4146,417 7,4180,4182,4188,4268,4269 ,4270,4365,4372,4377,4378, 4379,4385,4479,4490,4514,4 553,4556,4598,4656,4670,47 26,4777,4803,4805,4810,483 2,4870,4893,4901,4953,5003 ,5031,5034,5037,5045,5164, 5175,5177,5180,5182,5190,5 220,5240,5244,5246,5263,52 74,5283,5352,5370,5399,542 2,5504,5553,5554,5589,5600 | {1,1,1,2,1,2,1,1,3,2,1,3,2,1,2,1, 3,1,2,1,2,12,1,1,4,15,8,1,1 ,2,1,1,1,1,1,5,1,1,2,2,2,8,4,10 ,1,30,1,4,1,3,1,3,5,1,1,1,1,1,2,1 ,1,5,1,5,1,7,7,1,1,4,6,1,1,1,2,7, 2,1,1,36,2,1,7,2,1,2,3,1,2,1,2,7, 16,1,1,3,1,1,1,38,1,1,1,2,2,1,1, 4,5,1,1,1,4,1,3,1,1,7,2,17,5,1,1, 1,1,2,1,1,1,1,2,1,2,2,1,1,1,2,3,1 ,6,1,2,5,1,3,1,18,1,2,3,3,5,1,1 ,1,1,2,1,1,2,3,1,1,21,1,2,4,1,1,1 ,1,1,3,1,2,4,67,1,2,1,2,1,2,1,1,2 0,8,1,1,3,1,1,1,1,3,2,1,1,1,1,17, 1,4,3,1,1,2,17,2,1,1,1,1,1,2,1, 1,1,3,1,2,1,1,1,1,2,1,3,1,1,3,2,1 ,2,2,1,1,3,1,3,1,1,1,1,2,1,1,1,3, 2,2,1,1,1,1,2,4,67,1,2,1,2,1,2,1,1,2 1,4,1,1,1,1,4,4,1,1,1,1,3,2,1,1 ,2,1,1,3,1,1,1,4,2,2,1,1,11,2,2,1 ,1,1,1,1,1,2,1,1,4,1,14,1,1,3,4 ,1,2,7,2,1,1,1,1,2,3,1,4,1,1,1,1, 1,1,1,2,1,3,1,4,3,2,1,3,3,3,1,2,1 ,1,1,3,4,3,1,6,2,1,1,1,1,2,1,4,3, 1,3,1,1,1,2,1,1,1,1,1,1,1,1,2,2 ,1,2,1,2,1,4,3,1,2,2,1,1,5,3,12,1 | {12,14,19,18,8,19,20,17,11,2 7,14,10,15,16,22,17,17,16,1 4,12,9,17,14,23,11,18,12,18, 21,17,13,13,19,9,17,16,20,2 2,17,10,11,19,14,11,18,19,1 5,12,18,19,12,11,18,15,16,1 9,12,20,11,14,14,16,13,18,1 4,6,11,15,11,18,17,14,13,17, 20,10,20,16,17,12,22,17,13, 14,15,18,22,16,17,14,15,12, 18,11,16,10,12,16,20,16} | {32,86,32,51,19,65,86,36,3 2,57,47,86,90,9,5,69,64,85 ,48,90,9,26,54,17,38,0,93, 84,18,91,40,3,30,72,6,49,3 8,92,37,22,1,84,60,91,94,6 6,61,10,51,9,52,13,87,6,82 ,25,6,76,62,77,19,2,80,49, 27,86,50,17,78,87,39,80,2 4,51,71,70,17,84,80,21,94, 32,86,33,90,20,59,48,48,2 1,25,20,75,5,21,54,43,72,7 1,74,11,62,6,35,14,29,57,8 3,14,37,56,8,21,42,41,63,1 5,52,12,63,25,89,83,53,47, 5,7,90,29,31,64,92,93,70,2 8,59,0,37,95,14,75,51,74,4 8,46,67,64,61,72,76,76,49, 17,12,2,64,69,62,55,98,93, 71,90,38,42,70,50,94,8,45, 60,35,48,34,35,94,53,99,7, 25,27, 84,27,45,48,29,9,17,43,16, 15,36,40,57,27,82,28,29,2 8,88,74,88,23,22,74,58,69, 27,10,76,5,37,12,32,82,60, |

Figure 6A

| | | 13,44,77,57,12,44,45,52,2, |
|---|---|---|
| ,5604,5666,5686,5732,5784, | ,1,1,1,1,1,1,2,1,1,2,1,2,1,1,2,1,24 | 24,86,82,53,66,70,79,54,4 |
| 5789,5803,5998,6008,6046,6 | ,1,2,3,1,1,2,1,1,20,4,1,7,2,1,1,2 | 5,2,80,3,23,60,65,99,17,3, |
| 056,6058,6082,6093,6094,61 | ,1,1,1,7,1,1,1,6,1,1,8,1,3,5,1,8, | 64,1,37,76,14,81,6,23,46,2 |
| 03,6115,6117,6118,6119,612 | 1,7,3,3,1,4,2,2,1,1,1,1,1,37,3, | ,21,98,4,45,37,38,51,3,8,3 |
| 0,6140,6222,6230,6237,6244 | 2,2,4,3,2,1,6,1,1,4,5,4,1,2,2,47, | 0,10,5,32,90,61,7,50,26,59 |
| ,6245,6408,6413,6510,6579, | 2,1,1,1,1,1,3,1,1,1,2,1,1,1,1,2 | ,19,29,23,20,67,51,35,0,57 |
| 6600,6660,6698,6765,6767,6 | ,1,16,1,1,2,1,1,2,1,1,1,1,8,3,1,1 | ,10,46,60,31,97,16,29,86,7 |
| 796,6839,6918,6927,7621,76 | ,6,13,12,15,2,2,2,1,1,1,2,1,4,1, | ,80,89,67,10,99,73,95,42,3 |
| 23,7710,7120,7172,7270,727 | 2,2,1} | 4,2,44,60,61,64,90,36,84,5 |
| 5,7279,7308, | | 7,88,71,9,97,82,8,9,65,5,7 |
| | | 8,94,91,85,74,32,52,37,84, |
| ... | | 25,32,26,59,86,70,20,48,3 |
| | | 4,62,84,71,71,24,42,80,74, |
| 9311,9310,9306,9303,9297,9 | | 76,88,83,42,45,61,88,88,9 |
| 296,9247,9219} | | 8,15,21,51,52,5,28,36,31,8 |
| | | 8,22,53,60,22,40,22,59,11, |
| | | 93,83,5,25,57,34,14,93,28, |
| | | 59,6,16,0,5,83,21,8,87,78, |
| | | ... |
| | | 4,44,66,42,69,53,78,27,42, |
| | | 2,76,76,27,43} |

Figure 6B

HIGHLY SCALABLE MEMORY-EFFICIENT PARALLEL LDA IN A SHARED-NOTHING MPP DATABASE

BACKGROUND

This invention relates generally to latent Dirichlet allocation ("LDA") analysis of a dataset to discover themes or topics, and more particularly to parallel LDA analysis of a distributed dataset comprising a large collection of unstructured data, referred to herein as documents, in a shared-nothing massively parallel processing (MPP) database.

Documents of a dataset can be represented as random mixtures of latent topics, where each topic may be characterized by a probability distribution over a vocabulary of data elements such as words. Documents comprise collections of words, and each document may comprise multiple topics. Given a large corpus of text, i.e., a dataset, LDA can infer a set of latent topics from the corpus, each topic being represented as a multinomial distribution over words denoted as P(w/z), and can infer the topic distribution for each document represented as a multinomial distribution over topics denoted as P(z/d). All of the documents in a corpus share the same set of topics, but each document has a different mix (distribution) of topics. Gibbs sampling has been widely used for the inference of LDA because it is simple, fast, has few adjustable parameters, and is easy to parallelize and scale.

Most existing LDA implementations are built upon MPI or Map/Reduce that read/write data from/to file systems, including local file systems, networked file systems, and distributed file systems like a Hadoop distributed file system (HDFS). LDA has a large memory requirement since it is necessary to aggregate results in a memory for processing. MPI and Map/Reduce are batch processing systems, and, as such, they can manipulate memory to meet the memory requirements without disrupting other ongoing processing tasks. This is not true for relational databases. There are no in-database SQL-like implementations of LDA for relational databases (RDBMS), particularly not for large distributed shared-nothing MPP databases. In contrast to reading and writing data in file systems, databases read and write data in parallel in tables using queries, which should not consume too much memory. Furthermore, Hadoop and other batch processing systems have parallel mechanisms that are different from those of databases, and batch processing implementations of LDA for file systems are not readily adaptable to databases.

It is desirable to provide scalable memory efficient parallel LDA implementations in shared-nothing MPP databases to enable in-database topic modeling and topic-based data analytics, and it is to these ends that the present invention is directed.

BRIEF DESCRIPTION OF THE DRAWINGS

FIG. 6, comprising

DESCRIPTION OF PREFERRED EMBODIMENTS

Figure 1:
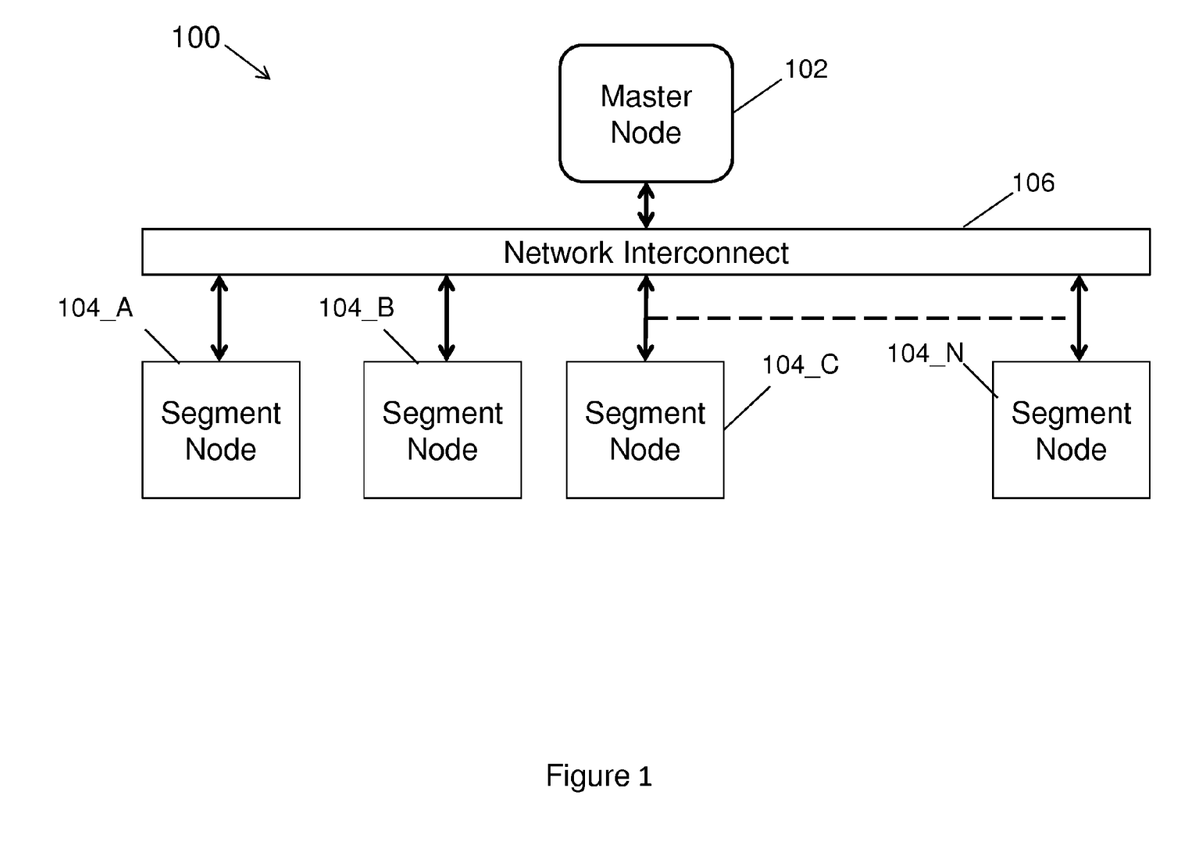
FIG. 1 is a diagrammatic view of the architecture of a distributed shared-nothing MPP database system with which the invention may be used.

FIG. 1 is an overview of the architecture of one type of distributed relational database system 100 with which the invention may be employed, the database system shown being a massively parallel processing (MPP) shared nothing distributed database system. The database system may include a master node 102 which connects to a cluster of a plurality of distributed segment nodes 104_A through 104_N via a network interconnect 106. Each segment node may comprise one or more database (DB) instances. The master and segment nodes may comprise generally similar server systems and may have similar architectures and process models. Data stored in the database is distributed across and stored on local database instances of the segment nodes. The segment nodes operate together under the direction of the master node to process user data requests (queries) and return results, and to perform other processing operations, such as data analytics, as will be described. The segments 104_1-104_N work together under the direction of the master node 102 to process workloads.

Figure 2:
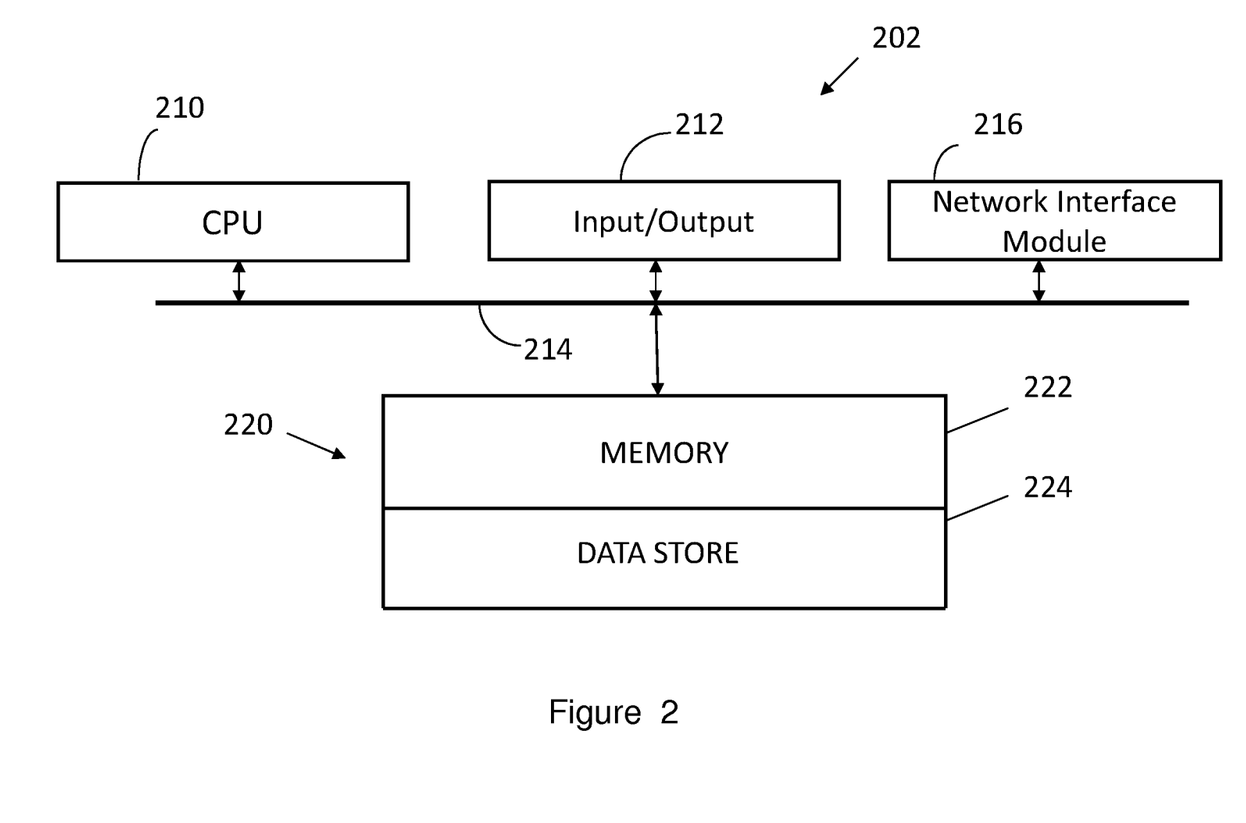
FIG. 2 illustrates a preferred embodiment of a node of the database system of FIG. 1.

FIG. 2 illustrates an example of the architecture of a master node 202 of the database system 100 that is configured to perform processes and operations in accordance with the invention. The master node and the segment nodes may have substantially similar architectures, as stated above. The master node 202 may comprise a host computer server system which may comprise a single CPU 210 or which may be a multi-processor system comprising a plurality of CPUs connected to input/output (I/O) devices 212 by a communications bus 214. The I/O devices may be standard computer system input and output devices. A network interface module 216 may also be connected to bus 214 to allow the master node to operate in the networked environment. The master node may further have storage 220 comprising non-transitory physical storage media connected to the bus that embodies executable instructions, such as an operating system and application programs, to control the operations of the computer system. Storage 220 may include a main memory 222 embodying control programs that control the CPU to operate in accordance with the invention, as will be described, and may contain other storage including a data store 224 that may store system configuration information, a catalog, logs, applications and utilities, and, as will be described, a software library for in-database analytics processing objects and user-defined functions.

The master node 202 may be responsible for accepting queries in SQL or another database structured query language from a client (user), planning a query, slicing a query plan into multiple slices, dispatching the query plan slices to various segments for execution on the locally stored data in the database storage of each segment, and collecting the query results from the segments. The master may also accept directions from a user or other application programs to perform other data analytics processing operations and the like, including LDA processing, as will be described. In addition to interfacing the segment hosts to the master host, the network interface module 216 may also communicate data, instructions and results between execution processes on the master and the segments.

Figure 3:
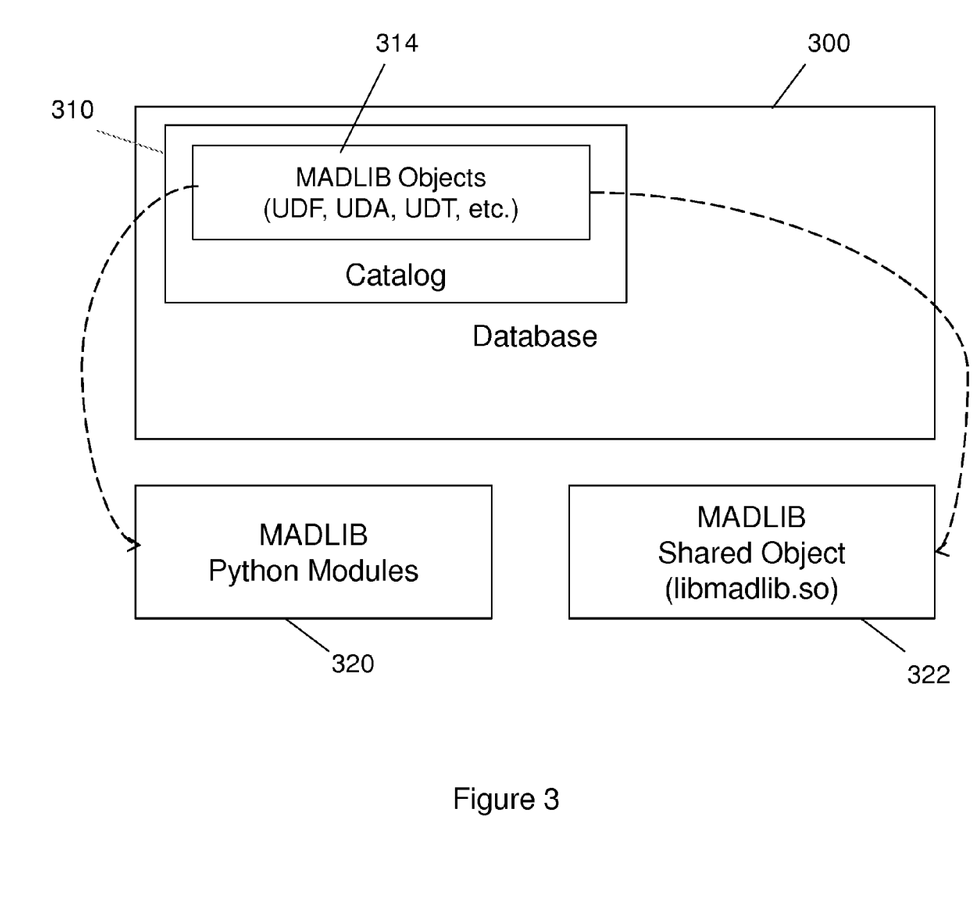
FIG. 3 is a block diagram of an architecture of a software library of database objects for in-database analytics which may be used to implement LDA.

FIG. 3 is a block diagram that illustrates the architecture of a software library 310 comprising objects 314 such as user-defined functions (UDFs), user-defined aggregates (UDAs), etc., which are referred to herein as MADlib objects, for in-database analytics. A separate software object library is preferably integrated into the database 300 of each segment node, so that the objects are readily available on all segments. The objects 314 may comprise MADlib processing algorithms 320, including modules for LDA Gibbs sampling, written in a programming language such as Python that interfaces with the database SQL, and may further comprise a MADlib shared object library 322. An object may be called by the database kernel on each segment node when the computer on the segment node is executing a query which explicitly or implicitly depends upon the called object's functionalities. In accordance with the invention, the LDA algorithm may be implemented in a data-parallel way where each segment node has only a part of the dataset and the LDA modeling process is done in parallel on the cluster of nodes, as described more fully below.

Prior to describing the invention, Gibbs sampling for LDA will first be described. As explained above, LDA is used to learn characteristics of a dataset to develop a model for inference. The characteristics may include P(w|z), the word distribution for a given topic, and P(z|d), the topic distribution for a given document. Simply stated, Gibbs sampling for LDA informs how to sample (assign) a new topic for a word in a document based on the current topic assignments of the words in a corpus. This requires calculating $P(z_i=k|z_{-i}, w)$, the conditional probability distribution of assigning topic k to the $i_{th}$ word given $z_{-i}$, the current assignments of topics to all the other words excluding the $i_{th}$ word. Once the probability distribution is determined, the sampling becomes straightforward. The conditional probability distribution may be determined from the following Equation 1, which indicates how to sample (assign) a new topic for each word in a corpus. Equation 1:

$$P(z_i = k \mid z_{-i}, w) \propto \frac{n_{-i,k}^{w_i} + \beta}{n_{-i,k} + W\beta} \times (n_{-i,k}^{d_i} + \alpha)$$

The following table gives the meaning associated with each element of Equation 1:

| Element | Meaning |
| --- | --- |
| i | Index of the $i_{th}$ word in the corpus, $i \in \{1, 2, \ldots, M\}$, where M is the total number of words in the corpus |
| k | Index of a topic, $k \in \{1, 2, \ldots, 7\}$, where T is the number of topics |
| w | Sequence of words appearing in the corpus, where $|w| = m$ |
| $w_i$ | Word identifier of the $i_{th}$ word, where $w_i \in \{1, 2, \ldots, W\}$, where W is the size of vocabulary |
| $d_i$ | Document identifier of the $i_{th}$ word, where $d_i \in \{1, 2, \ldots, D\}$, where D is the size of corpus |
| $z_i$ | Topic assigned to the $i_{th}$ word |
| $z_{-i}$ | Topic assignments of all other words except for the $i_{th}$ word |
| $n_{-i,k}^{w_i}$ | Count of word $w_i$ assigned to topic k, not including the current assignment of the $i_{th}$ word, i.e. $n_{-i,k}^{w_i} = \begin{cases} n_k^{w_i} & \text{if } z_i \neq k \\ n_k^{w_i} - 1 & \text{if } z_i = k \end{cases}$ |
| $n_{-i,k}^{d_i}$ | Count of words assigned to topic k in document $d_i$, not including the current assignment of the $i_{th}$ word, i.e. $n_{-i,k}^{d_i} = \begin{cases} n_k^{d_i} & \text{if } z_i \neq k \\ n_k^{d_i} - 1 & \text{if } z_i = k \end{cases}$ |

-continued

| Element | Meaning |
| --- | --- |
| $n_{-i,k}$ | Count of words assigned to topic k in whole corpus, not including the current assignment of the $i_{th}$ word, i.e. $n_{-i,k} = \begin{cases} n_k & \text{if } z_i \neq k \\ n_k - 1 & \text{if } z_i = k \end{cases}$ |
| $n_{D \times T}$ | Per-document topic count matrix of D by T, $n_z^d \in n_{D \times T}$ |
| $n_{W \times T}$ | Per-word topic count matrix of W by T, $n_z^w \in n_{W \times T}$ |
| $n_{1 \times T}$ | Corpus-level topic count matrix of 1 by T, $n_z \in n_{1 \times T}$ |

Figure 4:
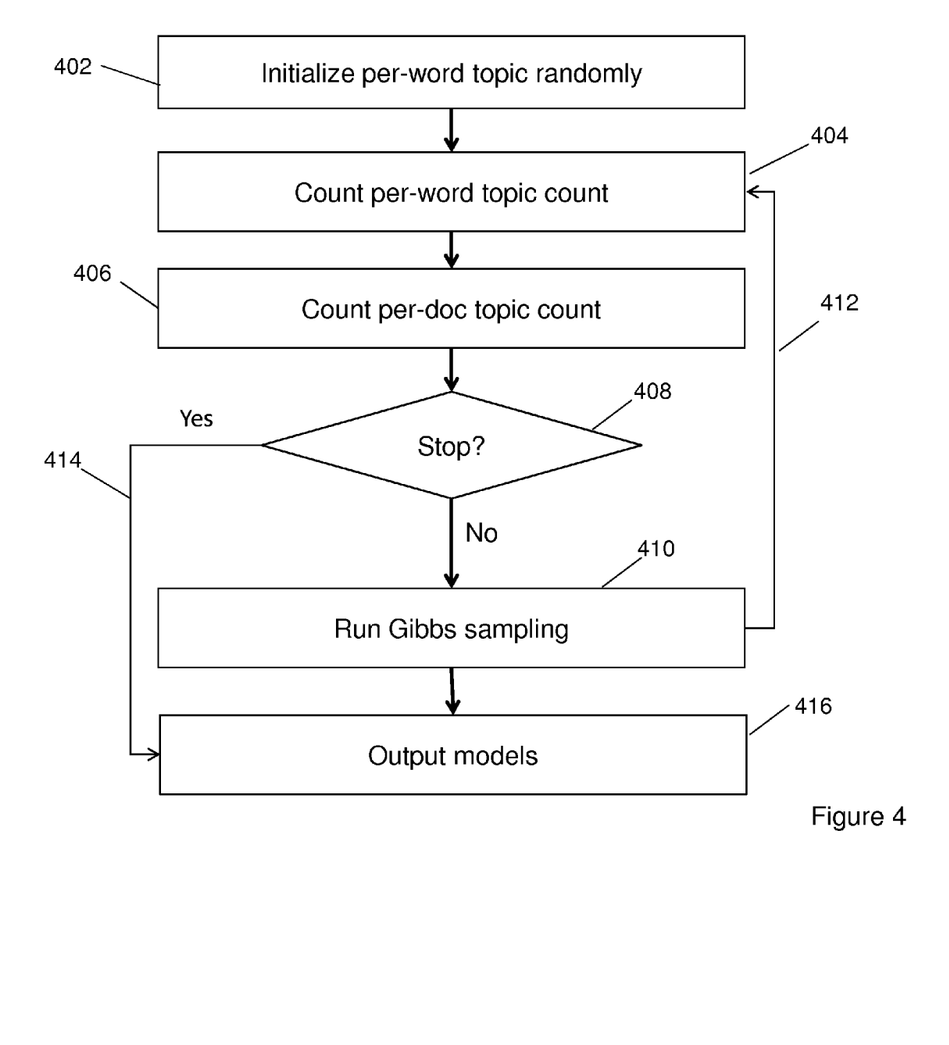
FIG. 4 is a diagrammatic view of an example of a workflow of a LDA Gibbs topic modeling process in accordance with the invention.

As a workflow to calculating the probability distribution of assigning a topic to a word according to Equation 1, initially each word in a document may be randomly assigned a topic. Next, the per-document, per-word and corpus level topic counts according to the random assignment may be determined. These per-document counts may be used to compute the probability distribution during a sampling process, and the foregoing steps iterated where during each iteration each word in each document is sampled (assigned) a new topic and the topic counts are recalculated. Each iteration refines the per per-word topic assignments. The iterations may continue until a stop condition is satisfied. The workflow is illustrated in FIG. 4 and will be described in more detail below.

In a centralized implementation, if the per-word and corpus-level topic count matrixes ($n_{W \times T}$ and $n_{1 \times T}$) are such that the matrices can be held in memory, the dataset can be handled document by document and the results can be merged into the matrices in memory while initializing or sampling a topic for each word. Also, the process can run in a similar way for a distributed parallel implementation in batch processing systems based upon Hadoop or MPI since separate documents can be distributed to a set of processing nodes. Each processing node can handle a subset of documents if the topic count matrixes $n_{W \times T}$ and $n_{1 \times T}$ are synchronized at initialization and at the end of each iteration.

However, there are problems implementing parallel LDA in parallel databases. First, a database is designed as an interactive system, and the execution of any single query should not consume too many resources or inhibit the execution of other queries. In particularly, a SQL query should run within a proper memory quotation and should not over consume memory. The need to store the per-word and corpus-level topic count matrixes ($n_{W \times T}$ and $n_{1 \times T}$) in memory means that with an increase in the vocabulary size and/or the topic number, the memory usage will also increase which can make the system non-scalable. Also, since databases store data in tables and data access and manipulation are done via SQL queries, it is necessary to design the data structures and SQL queries to avoid manipulating large topic count matrixes.

The invention addresses these problems by parceling out the documents of a dataset and distributing subsets of documents to a set of segment nodes for processing. Each node will process its subset of the documents to produce per-word and corpus level topic count matrices that can be held in memory locally at each segment node, and such that the matrices can be synchronized at each iteration of the processing algorithm. This enables a highly scalable and memory-efficient solution for parallel LDA in shared-nothing MPP databases. In a preferred embodiment, the data is distributed to a plurality of segment nodes using the available built-in data distribution mechanism of an MPP database, and queries are dispatched to these segment nodes by the master node where they are executed in parallel. This allows each segment node to do Gibbs sampling locally on a subset of the corpus of documents, which significantly reduces the load on the master node and avoids a scalability bottleneck.

As will be described more fully, each document may be represented as quadruple comprising <docid, wordcount, words, counts>, where docid is a document identifier; wordcount is the total number of words in the document; words is a list of unique word identifiers in the document, and counts is a list of integers representing the number of occurrences of unique words. This representation enables each document to be stored as a single row having four separate fields by a single segment node instead of being stored as multiple rows by multiple segments. Thus, the whole dataset may be distributed by docid. Gibbs sampling for LDA needs the per-word topic count to calculate the conditional probability according to the foregoing Equation 1. Representing each document as a single row having separate fields for the quadruple <docid, wordcount, words, counts> as described above requires passing only one row to a UDF sampling operation instead of the whole topic count matrix, thereby avoiding over consumption of memory.

Figure 5:
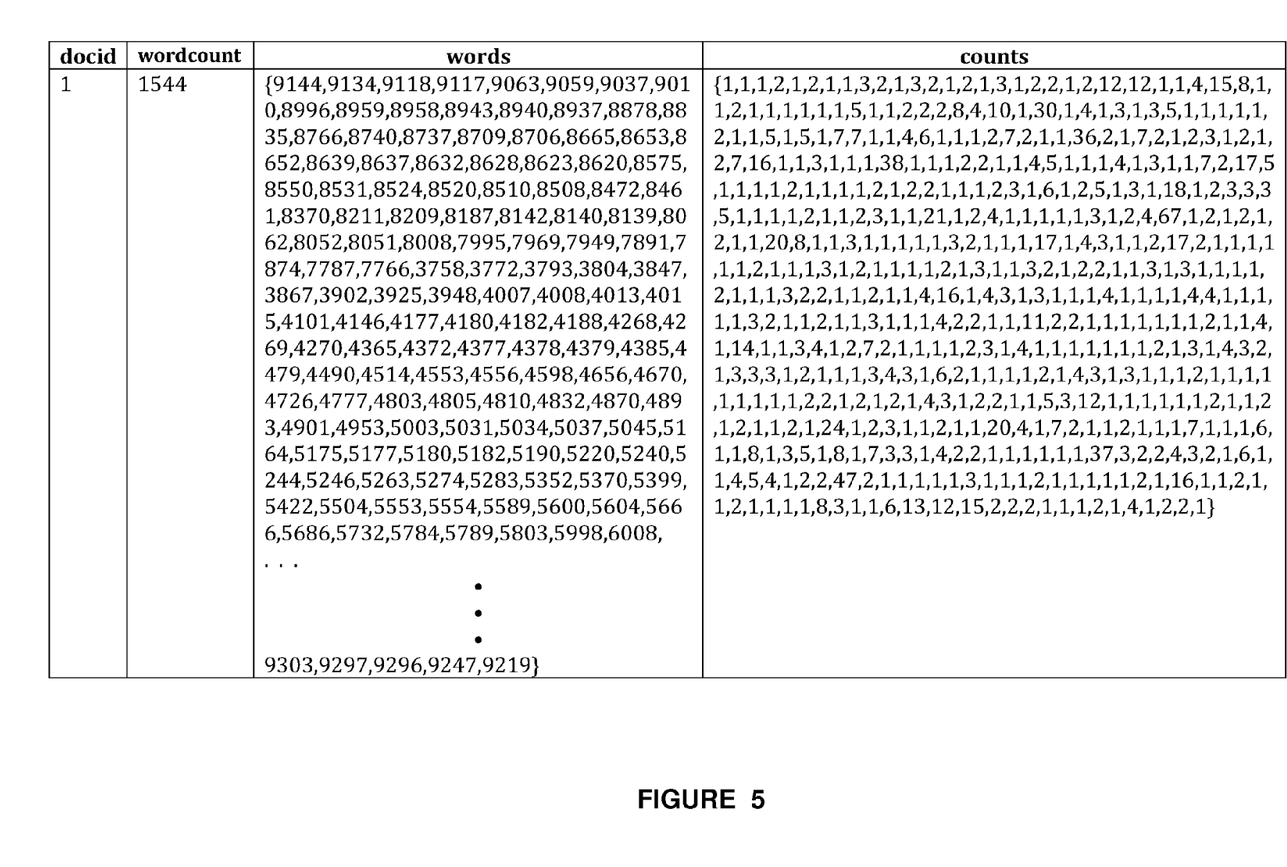
FIG. 5 is an example of a portion of an input work table in accordance with the invention.

FIG. 5 is an example of one row of an input data table having four fields (columns): docid; wordcount; words; and counts corresponding to the elements of the quadruple. Each row of the table represents a document identified by docid, and the figure shows one row for an example document, docid 1, which has a wordcount of 1544 corresponding to the total number of words in the document docid 1. The words column of the table is a field of comma-delimited data that gives the list of unique words in docid 1, where each unique word is represented by a unique numerical value. (In FIG. 5, the words list shown has been truncated, as indicated by the dots, to reduce the size of the figure.) The counts column is field comprising a list of comma-delimited numbers that represent the number of occurrences of the unique words in the document. The number of unique words is len(words)=len(counts)= 531 in the example shown in the figure, and the sum of the counts is equal to the wordcount, i.e., sum(counts)=wordcount.

A key part of Gibbs sampling for LDA is the need to update topic assignments of words iteration by iteration, as previously described. The invention may employ data structures in the form of one or more work tables for holding topic assignments. The work tables may have a structure that is similar to one holding the training dataset (corpus), as shown and as will be described in connection with FIG. 6. Furthermore, the invention affords an implementation that significantly improves efficiency by enabling new data to be inserted into a table rather than updating existing data in a table. INSERT operations in databases to insert data into tables are more efficient than UPDATE operations that update existing data. In a preferred embodiment, the invention employs separate data structures (tables) and INSERT operations rather than UPDATE operations for updating one table with topic assignments for each iteration of the sampling algorithm. In an embodiment, the invention provides two work tables having the same structure, Table 0 and Table 1, which are used alternately as input and output tables. During a first iteration, the first table, Table 0, may be used as the input to the algorithm and the second table, Table 1, is used as the output of the algorithm. In the next iteration, the roles of the tables will reverse. Table 1 populated from the first iteration will serve as the input to the algorithm for the second iteration, and the results of the sampling algorithm will be inserted into Table 0. This "ping-ponging" of tables significantly reduces the time needed for data manipulation and speeds up the whole sampling process.

FIG. 4 is a diagrammatic view of an exemplary workflow of LDA Gibbs topic modeling in accordance with the invention. The workflow may be run in parallel on each separate segment node of the MPP database. Referring to FIG. 4, at 402 the topic assignment of each word in a dataset on a node may be first initialized by randomly generating an initial topic assignment to each word in each document. This may be accomplished, for example, by a user defined function (UDF): MADLib.random_assign that randomly generates the initial topic assignment in a first Work Table 0 from an input data table by generating random numbers for topic assignments and inserting them into the Work Table 0. This may be accomplished using, for example, the following SQL script:

```
INSERT INTO work_table_0
  SELECT
    docid, wordcount, words, counts,
    MADLib.random_assign(wordcount, topic_num) AS doc_topic
  FROM data_table
  Note that doc_topic is a composite type defined as follows:
    CREATE TYPE doc_topic AS(
      topic_dist      INTEGER[ ],
      topic_assign    INTEGER[ ])
```

Returning to FIG. 4, in steps 404 and 406 the workflow process obtains the corpus level and per-word topic distributions (models). This may be accomplished with the following SQL script:

```
INSERT INTO model_table
  SELECT
    voc_size, topic_num, alpha, beta,
    MADLib.count_topic_agg (
      words, counts,
      doc_topic,
      voc_size, topic_num) AS model
  FROM work_table_in
  Note that model is a composite type defined as follows:
    CREATE TYPE model AS(
      corpus_topic_dist    INTEGER[ ],
      word_topic_dist      INTEGER[ ])
```

The SQL script obtains the topic distributions for the segments, and includes a UDA operation MADLib.count topic_agg that aggregates word and topic counts from across all database segments to provide word counts, document topics and number and vocabulary size. The doc_topic element may be a composite type that includes the topic distribution topic_dist in a document (the number of words assigned to a topic in a document), and topic_assign is the topic assignment of each word in the document comprising an array of word counts per topic. Different occurrences of the same word in a document may have different topic assignments.

Figure 6A:
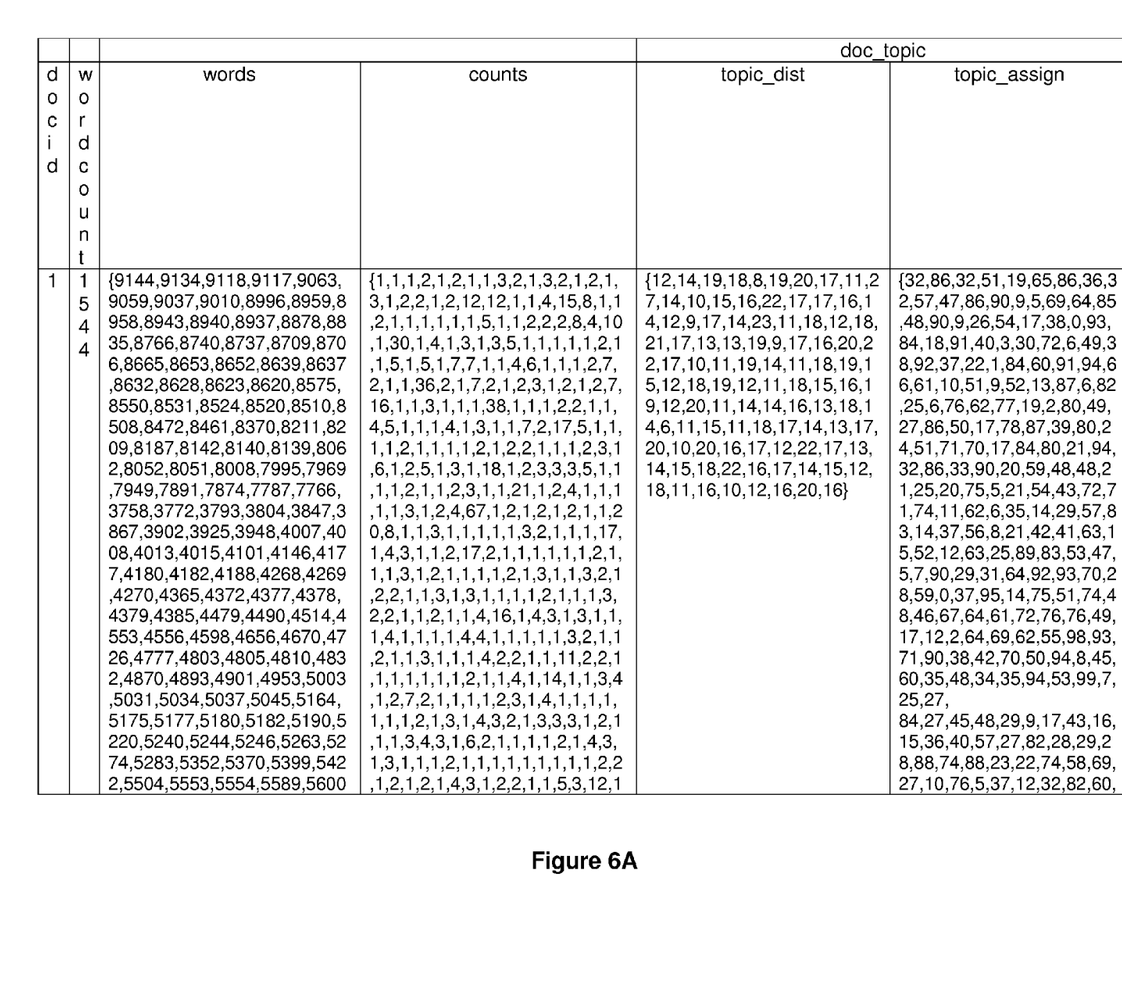
FIGS. 6A and 6B, is an example of a portion of a work table in accordance with the invention.
Figure 6B:
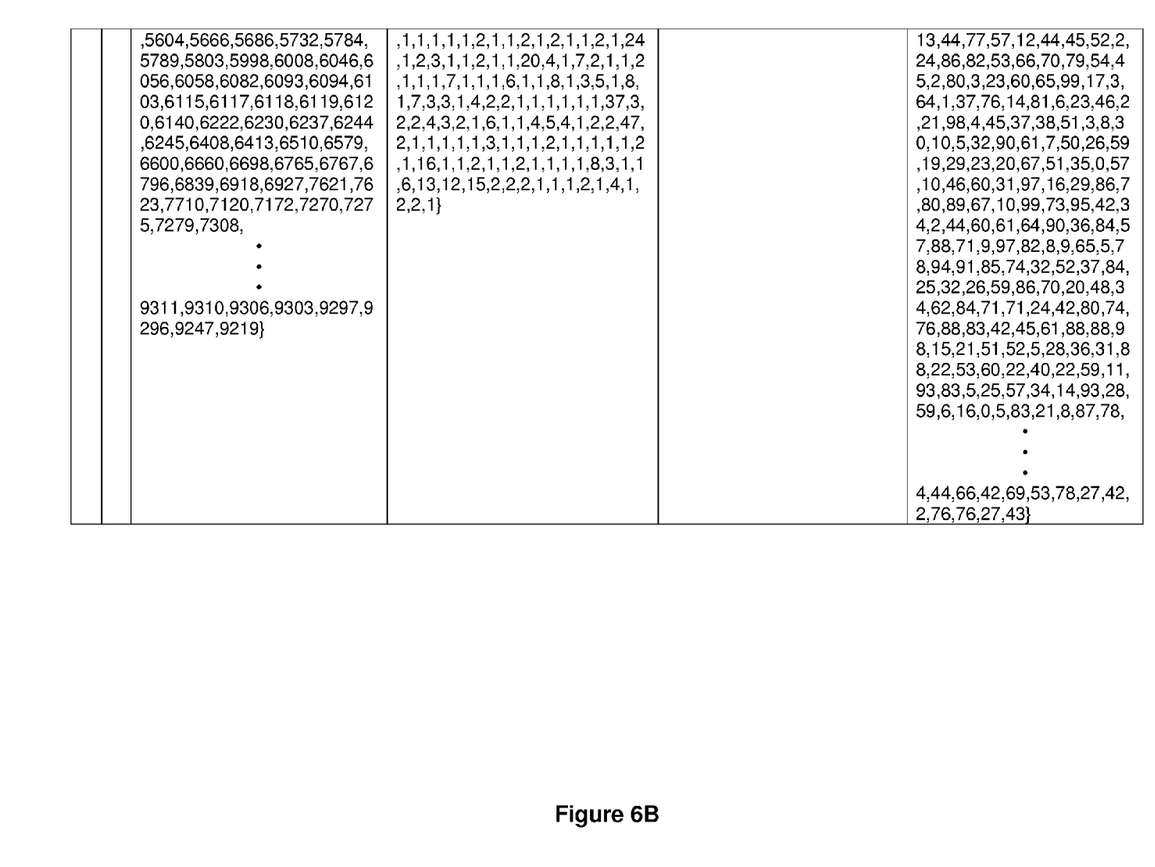

FIG. 6 is an example of a portion of one row (for one document) of a working table produced by the iterative Gibbs sampling process or by the random initialization script. The table comprises six columns (fields of the row). The columns correspond to the fields docid, wordcount, words and counts which may be the same and have the same data format as described above and shown in FIG. 5. (Similar to FIG. 5, the words and the topic_assign columns of the table of FIG. 6 have been truncated, as indicated by the dots, to reduce the size of the figure.)

Steps 408 and 410 of FIG. 4 illustrate one form of an iteration process for the Gibbs sampling process of Equation 1. As long as the output of step 406 has not reached a stop condition, Gibbs sampling is performed at 410 where the per-document, per-word and corpus-level topic counts are used to sample new topics for each word in each document to compute the probability distribution according to Equation 1. The results may be fed back at 412 to step 404, and the process repeated. Upon a stop condition being satisfied, e.g., a change of likelihood between two adjacent iterations being smaller that a predetermined threshold, or a predetermined number of iterations being reached, the process branches at 414 to step 416 where which the LDA results from Gibbs sampling may be aggregated and output as models. The models may be stored in the database, and used to situate new input data into existing models. Queries may also be run on the stored database models to derive desired information.

The following SQL script may be used for the Gibbs sampling 410, where Work Table 0 and Work Table 1 may be used alternately as work_table_out and work_table_in:

```
INSERT INTO work_table_out
SELECT
    docid, wordcount, words, counts,
    MADLib.gibbs_sample(
        words, counts, doc_topic,
        (SELECT model FROM model table),
        alpha, beta, voc_size, topic_num)
FROM
    work_table_in
    Note that gibbs_sample is a stateful UDF which allows the updated
    model to be transferred to the continuous function invocations.
```

FIG. 6 is an example of Work Tables 0 and 1. The doc_topic term may be obtained directly from the Work Table. The word_topic and corpus_topic terms may be obtained from the function MADLib.count_topic_agg.

In the foregoing SQL scripts, there are two UDFs, i.e., random_assign and gibbs_sample, and one UDA, i.e., count_topic_agg, indicated that are constructed to have the following functionality:

random_assign: assigns a topic to each occurrence of a word in a document randomly and returns an array of topic assignments;

gibbs_sample: computes the conditional probability distribution according to Equation 1, draws a new topic from the distribution, and returns the new topic; and count_topic_agg: scans through all the topic assignments, accumulates the number of occurrences of each topic, and returns an array of topic counts. The transition state variable (which stores the per-word and corpus-level topic counts may be very large, e.g., 1040 MB, when the vocabulary size*topic_num is large. To reduce the network overhead, the state variable can be compressed, because the per-word topic counts is usually a sparse matrix, before transferring from the segment node to the master node for merging.

These UDFs and UDA may be written in any convenient programming language, such as Python, to interface with the SQL code of the scripts.

As may be appreciated from the foregoing, the invention affords a highly-scalable, memory-efficient parallel LDA process for a shared-nothing MPP database using a native SQL-based approach which avoids the necessity of moving data between database tables and file systems. By writing directly to alternate work tables and processing parts of the dataset in parallel on distributed database segments, as described above, the invention does not require a large amount of memory, can readily scale to handle a very big dataset, and can achieve near-linear speedup as the number of database segment nodes increase.

While the foregoing has been with respect to preferred embodiments of the invention, it will be appreciated that changes to these embodiments may be made without departing from the principles and spirit of the invention, the scope of which is defined in the appended claims.

The invention claimed is:

1. A method of parallel latent Dirichlet allocation (LDA) processing of a dataset in an MPP relational database comprising a master node connected via a network to a plurality of distributed database segments, the dataset comprising a plurality of documents, each document being a mixture of topics where each topic is characterized by a probability distribution over a vocabulary of words, the method comprising:

distributing subsets of said documents of said dataset to said plurality of segments, where each one of said documents of a subset is distributed to and stored on one single segment of said relational database;

determining in parallel on each segment for each document of the subset on said segment a per-word and a per-document topic count;

performing in parallel on each segment LDA analysis using said determined topic counts to assign words to a new topic;

calculating in parallel on each segment per-word and per-document probability distributions of topic assignments;

iterating said determining, said performing, and said calculating steps on each segment until a predetermined stop condition is satisfied, and storing results locally in memory on each segment, said iterating comprising updating topic assignments at each iteration by providing on each segment two work tables for holding topic assignments that alternate roles as an input table and as an output table, a first work table storing topic assignments from a previous iteration and serving as an input table of topic assignments to a next iteration, and a second work table serving as an output table for updated topic assignments from said next iteration, and alternating roles of said first and second tables for input and output on each said iteration for updating topic assignments; and aggregating results from said plurality of segments to form an inference model.

2. The method of claim 1, wherein said LDA analysis is performed locally on each segment using Gibbs sampling of said documents of said subsets on said each segment.

3. The method of claim 1 further comprising synchronizing said per-word and said per document topic counts on each segment following each said iteration, and wherein said determining comprises aggregating the counts from across the segments.

4. The method of claim 2 further comprising representing each document by a quadruple comprising <docid, wordcount, words, counts>, and distributing and storing each document by a document identifier (<docid>) as a single row in a table on said single segment, and wherein said Gibbs sampling of a document comprises sampling said single row.

5. The method of claim 1 further comprising providing on each segment an object library of processing modules that integrate with SQL operations on the segment to determine said per-word and said per-document topic counts and to calculate said probability distributions.

6. The method of claim 5, wherein said processing modules of said object library comprise executable objects that are called by an SQL query on the segment when the SQL query requires functionality provided by an object.

7. The method of claim 1, wherein said determining comprises initially assigning words in each document to a topic, and further calculating corpus-level topic counts.

8. The method of claim 1 further comprising using said inference model to assign new words to a topic.

9. The method of claim 1, wherein said aggregating comprises forming a plurality of inference models for a corresponding plurality of topics, and wherein the method further comprises inferring one or more topics to a new document using said plurality of inference models.

10. The method of claim 9, wherein said inferring comprises calculating said probability distributions for the new document and assigning said new document to a topic using said probability distributions and said inference models.

11. The method of claim 1 further comprising storing said inference model in said database for execution of SQL queries on said model.

12. Non-transitory computer readable media for storing executable instructions for controlling the operation of computers on a plurality of segments of an MPP relational database for latent Dirichlet allocation (LDA) processing on said segments in parallel a subset of a dataset, the dataset comprising a plurality of documents, each document being a mixture of topics where each topic is characterized by a probability distribution over a vocabulary of words, said LDA processing comprising:

distributing subsets of said documents of said dataset to said plurality of segments, where each one of said documents of a subset is distributed to and stored on one single segment of said relational database;

determining in parallel on each segment for each document of the subset on said segment a per-word and a per-document topic count;

performing in parallel on each segment LDA analysis using said determined topic counts determine to assign words to a new topic;

calculating in parallel on each segment per-word and per-document probability distributions of topic assignments;

iterating said determining, said performing, and said calculating steps on each segment until a predetermined stop condition is satisfied, and storing results locally in memory on each segment, said iterating comprises updating topic assignments of words at each iteration by providing on each segment two work tables for holding topic assignments that alternate roles as an input table and as an output table, a first work table storing topic assignments from a previous iteration and serving as an input table of topic assignments to a next iteration, and a second work table serving as an output table for updated topic assignments from said next iteration, and alternating roles of said first and second tables for input and output on each said iteration for updating topic assignments; and aggregating results from said plurality of segments to form an inference model.

13. The non-transitory computer readable media of claim 12, wherein each segment has an object library of processing modules comprising executable objects for controlling the segment to perform user defined functions, and an executable object being called by an executing SQL query when said query requires functionality provided by said called executable object.

14. The non-transitory computer readable media of claim 13, wherein said executable objects comprise objects for performing Gibbs sampling for said LDA analysis on said subset using said determined per-word and per-document topic counts, and wherein said determining comprises aggregating counts from across said segments.

15. The non-transitory computer readable media of claim 12 further comprising instructions representing each document by a quadruple comprising <docid, wordcount, words, counts>, and distributing and storing each document by a document identifier (<docid>) as a single row in a table on said single segment, and performing Gibbs sampling of a document for said LDA analysis by sampling said single row.

16. The non-transitory computer readable media of claim 12 wherein said aggregating comprises instructions for forming a plurality of inference models for a corresponding plurality of topics, and for inferring one or more topics to a new document using said plurality of inference models.

17. The non-transitory computer readable media of claim 16 further comprising instructions for calculating said probability distributions for the new document and for assigning said new document to a topic using said probability distributions and said inference models.

* * * * *